United States Patent [19]

Yatabe et al.

[11] 4,320,169

[45] Mar. 16, 1982

[54] HEAT WAVE-REFLECTIVE OR ELECTRICALLY CONDUCTIVE LAMINATED STRUCTURE

[75] Inventors: Toshiaki Yatabe; Nobuo Suzuki, both of Hino; Ikuto Sugiyama, Hachioji, all of Japan

[73] Assignee: Teijin Limited, Osaka, Japan

[21] Appl. No.: 182,612

[22] Filed: Aug. 29, 1980

[30] Foreign Application Priority Data

Aug. 31, 1979 [JP] Japan ............................... 54-111430
Sep. 14, 1979 [JP] Japan ............................... 54-117237

[51] Int. Cl.$^3$ ...................... B32B 7/02; B32B 27/36; B32B 15/04
[52] U.S. Cl. ................................... 428/333; 428/216; 428/411; 428/412; 428/421; 428/470; 428/472; 428/480; 428/336; 428/477.7; 428/473.5; 428/523; 428/458; 428/626; 428/671; 428/672; 428/673
[58] Field of Search ............... 428/215, 216, 411, 412, 428/421, 425, 470, 472, 480, 477.7, 473.5, 523, 333, 336

[56] References Cited

U.S. PATENT DOCUMENTS

| | | | |
|---|---|---|---|
| 3,698,946 | 10/1972 | Kaspaul et al. | 428/472 X |
| 4,017,661 | 4/1977 | Gillery | 428/472 X |
| 4,166,876 | 9/1979 | Chiba et al. | 428/411 X |
| 4,234,654 | 11/1980 | Yatabe et al. | 428/472 X |

*Primary Examiner*—P. Ives
*Attorney, Agent, or Firm*—Wenderoth, Lind & Ponack

[57] ABSTRACT

In a heat wave-reflective or electrically conductive laminated structure composed of
(A) a shaped solid substrate,
(B) a transparent thin layer having a high refractive index in contact with one or both surfaces of a layer (C) below, wherein when the layer (B) is provided on both surfaces of the layer (C), it may, at one surface, be a transparent thin layer (B) whose refractive index is not high,
(C) a transparent heat wave-reflective thin layer of an electrically conductive metal in contact with the substrate (A) or with the transparent thin layer (B), and
(D) optionally, a transparent top layer; the improvement wherein said layer (C) is a layer composed of at least about 50% by weight of Ag, about 3 to about 30% by weight of Au and about 0.5 to about 30% of Cu, the amounts being based on the total weight of Ag, Au and Cu.

7 Claims, No Drawings

HEAT WAVE-REFLECTIVE OR ELECTRICALLY CONDUCTIVE LAMINATED STRUCTURE

This invention relates to an improvement in a heat wave-reflective or electrically conductive laminated structure having various superior properties, and as a result of containing a thin layer (C) of electrically conductive Ag together with small amounts of Au and Cu in specified ranges, exhibiting markedly improved light stability, resistance to heat degradation, resistance to pollutant gases and chemical resistance.

More specifically, this invention relates to a heat wave-reflective or electrically conductive laminated structure composed of (A) a shaped solid substrate, (B) a transparent thin layer having a high reflective index in contact with one or both surfaces of a layer (C) as defined below, wherein when the layer (B) is provided on both surfaces of the layer (C), it may, at one surface, be a transparent thin layer (B') whose refractive index is not high, (C) a transparent heat wave-reflective thin layer of an electrically conductive metal in contact with said substrate (A) or with said transparent thin layer (B), and (D) optionally, a transparent top layer; characterized in that said layer (C) is a layer composed of at least about 50% by weight of Ag, about 3 to about 30% by weight of Au and about 0.5 to about 30% by weight of Cu, the amounts being based on the total weight of Ag, Au and Cu.

A great number of suggestions about a heat wave reflective or electrically conductive laminated structure or the like have been made in many patent documents including U.S. Pat. Nos. 3,698,946, 3,962,488, 4,017,661 and 4,020,389, Japanese Laid-Open Patent Publication No. 66841/76, British Pat. No. 1,307,642, French Pat. No. 2043002, Belgian Pat. No. 693528, Canadian Pat. No. 840513, and west German OLS Nos. 2813394 and 2828576.

Transparent conductive layers have been widely used in applications utilizing their electric conductivity, for example in electrical and electronic fields as electrodes for liquid crystal display, electrodes for electroluminescence, electrodes for photoconductive photosensitive materials, antistatic layers, and heaters.

Selectively light-transmitting layers are also useful as transparent thermal insulating layers because they are transparent to light in the visible region but have the ability to reflect infrared light (including near infrared light). Accordingly, they can be used in solar energy collectors (water heaters), power generation by solar energy, and window portions of greenhouses and buildings. In particular, these layers will gain increasing importance because of their ability to act as transparent heat insulating windows which utilize solar energy and prevent dissipation of energy in modern buildings in which the windows occupy a large proportion of the wall surface. They are also important as films for greenhouses in agriculture which are used in cultivating vegetables and fruits.

Thus, the transparent conductive layers and selectively light-transmitting layers are important from the standpoint of electronics and the utilization of solar energy, and it is desired in the art to provide large quantities of such films of uniform quality and high performance at low cost.

Known transparent thin layers of electrically conductive metal disclosed in the above-mentioned patent documents and elsewhere include (i) thin films of metals such as gold, copper, silver, and palladium, (ii) thin films of compound semiconductors such as indium oxide, tin oxide and copper iodide, and (iii) thin films of electrically conductive metals such as gold, silver, copper and palladium which are made selectively transparent over a certain wavelength region. Indium oxide or tin oxide films having a thickness of several thousand Angstroms and laminates of metallic films and transparent conductive films are known to be selectively transparent and have a high ability to reflect infrared radiation. However, transparent electrically conductive films or selectively light-transmitting films having superior performances have not been produced commercially at low cost.

The above-cited west German OLS No. 2813394 (corresponding to U.S. Pat. No. 4,166,876 issued Sept. 4, 1979) discloses a transparent, electrically conductive laminated structure composed of (A) a transparent solid substrate, (B) a thin layer of an oxide of titanium in contact with said substrate (A), (C) a thin layer of an electrically conductive metal in contact with said layer (B), (D) a thin layer of an oxide of titanium in contact with said layer (C), and (E) optionally, a transparent top layer in contact with said layer (D), characterized in that (i) said substrate (A) is a film-forming synthetic resin layer, and (ii) said layer (B) is a layer of an oxide of titanium derived from a layer of an organic titanium compound and containing an organic residual moiety of said organic titanium compound.

In this patent document, a unitary thin metal layer containing both silver and copper is recommended as a preferred species of the thin layer (C) of electrically conductive metal. In particular, the use of layer (C) composed of Ag and Cu with a Cu content of 1 to 30% by weight based on the total weight of Ag and Cu is recommended.

Previously, some of the present inventors proposed a heat wave-reflective or electrically conductive laminated structure composed of (a) a shaped solid substrate, (B) a transparent thin layer having a high refractive index in contact with said substrate (A), (C) a transparent heat wave-reflective layer of an electrically conductive metal in contact with said layer (B), and (D) optionally, a transparent thin layer having a high refractive index (D') in contact with said layer (C) and a transparent top layer (D'') in contact with said transparent thin layer (D');

characterized in that said layer (C) is a layer composed of Ag and Au in which the amount of Au is 3 to 30% by weight based on the total weight of Ag and Au (co-pending U.S. patent application Ser. No. 56,192 filed July 9, 1979, now U.S. Pat. No. 4,234,654).

The west German OLS No. 2828576 recommends the use of a thin layer of a metal selected from gold, silver, copper, aluminum, and mixtures or alloys of at least two of these.

To the best of the knowledges of the present inventors, however, none of the prior literature references disclose a heat wave-reflective or electrically conductive laminated structure having an Ag layer containing small amounts of Au and Cu within the ranges specified in the present invention as the thin layer (C) of electrically conductive metal.

The present inventors furthered their investigations, and found that in the proposals made in the prior applications, OLS No. 2813394 and U.S. application Ser. No. 56,192, more improved light stability, resistance to heat degradation and chemical resistance are desired. In particular, in applications at places where a relatively long service life is required, such as in windows of buildings, it is desired to provide a laminated structure which has better overall environmental stability characteristics such as light stability, resistance to heat degradation, resistance to pollutant gases and chemical resistance and can exhibit a service life comparable to those of buildings and windows.

The present inventors made investigations in order to provide a laminated structure having more improved properties which meet such a desire. These investigations led to the discovery that by using the aforesaid transparent heat wave-reflective thin layer (C) in accordance with this invention comprising Ag as a major component and specified minor amounts of Au and Cu, unexpected improvements can be achieved over the case of using a layer (C) composed of Ag and Cu or Ag and Au, as shown in Examples and Comparative Examples given hereinbelow.

The various improving effects achieved by the co-presence of Au and Cu in specific minor amounts are unexpected results. As is well known from the Tammann Law (for example, see Annalen Der Physik, V Folge, Band 1, 1929, pages 309–317), a bulk alloy obtained by adding at least 50 atomic % of a noble metal to a less noble metal has chemical resistance almost the same as that of the noble metal. Although this law was empirically derived, it has been ascertained that it is applicable to a fairly wide area of metals. According to the Tammann Law, a gold/silver alloy containing 50 atomic % (i.e., 65% by weight) of gold shows the same chemical resistance as gold. In addition, the Tammann Law holds good with sufficiently annealed bulk alloys, but in the case of a thin metal layer such as the one used in the present invention, a noble metal must be added in a larger amount than the anticorrosive bulk alloy mentioned in the Tammann Law because of the effects of the great increase of the surface area, the nonuniformity of surfaces by vacuum deposition or sputtering, the increased crystallographic defects, and the increased activity of the new surface formed by vacuum deposition or sputtering. In other words, it is expected that to increase the chemical stability of a thin metallic layer composed mainly of silver close to that of gold, the gold will have to be added in an amount of at least 50 atomic %, i.e. at least 65% by weight.

It is expected that when a thin metallic layer containing Ag as a major component further includes a less noble metal such as Cu, it will be necessary to increase the content of Au further.

Unexpectedly, however, it has been found in accordance with this invention that chemical resistance, corrosion resistance, resistance to pollutant gases, durability to light and heat can be improved, and the disadvantages in the prior art can be overcome completely, by using a layer composed of Ag, Au and Cu in which the amount of Ag is at least about 50% by weight, the amount of Au is about 3 to about 30% by weight and the amount of Cu is about 0.5 to about 30% by weight, based on the total weight of Ag, Au and Cu as the thin layer (C) of electrically conductive metal of this invention.

Investigations of the present inventors have shown that the laminated structure of this invention composed of (A), (B), and (C) and optionally (D) in which the layer (C) is composed of a major amount of Ag and minor amounts of Au and Cu exhibits corrosion resistance which is about 4 times as high as that exhibited in the case of using a layer (C) composed only of Ag, about 3 times as high as that exhibited in the case of using a layer (C) composed of Ag and Au, and about 6 times as high as that exhibited in the case of using a layer (C) composed of Ag and Cu.

It has further been found that when a transparent top or protective layer (D) is provided in the laminated structure of this invention, its operation and effect are quite unexpected. Specifically, it has been found that the overall durability to light and corrosion of a laminated structure comprising a thin layer of Ag and Au and the protective layer (D) is 13 times as high as that of a laminated structure comprising a thin layer of Ag and the transparent top or protective layer (D), and the durability of a laminated structure comprising a thin layer of Ag and Cu and the protective layer (D) is about 80 times that of the aforesaid laminated structure comprising a thin layer of Ag and the protective layer (D), and that when the protective layer is provided in the laminate structure of this invention comprising a thin layer of Ag, Au and Cu, the durability increases to about 400 times.

It has also been found unexpectedly that the unexpected improving effect by the layer (C) in this invention is exhibited even when the three metals Ag, Au and Cu do not take a form of alloy, but are of a laminated structure composed of layers of these metals.

The mechanism of the operation and effect which are unexpectedly and surprisingly exhibit by the layer (C) comprising a major amount of Ag and specified minor amounts of Au and Cu has not yet been elucidated. The present inventors, however, presume that the presence of Au increases the chemical stability of the metallic thin layer and makes it easy to form a thinner continuous metallic film and possible to form a dense film with a small scattering loss of silver, and that the presence of Cu acts as a site of de-photoactivation in photodegradation of silver and serves to improve the mechanical properties of a thin silver film. It should be understood however that the present invention is in no way bound to such a theoretical speculation.

It is an object of this invention to provide a heat wave-reflective or electrically conductive laminated structure having improved properties.

The above and other objects and advantages will become more apparent from the following description.

The shaped solid substrate (A) constituting the laminated structure of this invention may be made of any organic materials and inorganic materials or mixtures thereof. The organic materials are preferred. Examples of the organic materials include thermoplastic resins such as polyethylene terephthalate, polyethylene naphthalate, polycarbonate, acrylic resins, ABS resin, polystyrene, polyacetal, polyethylene, polypropylene, polyamides, and fluorocarbon resins; thermosetting resins such as epoxy resins, diallyl phthalate, resins, silicon resins, unsaturated polyester resins, phenolic resins, and urea resins; and solvent-soluble resins such as polyvinyl alcohol, polyacrylonitrile, polyurethane, aromatic polyamides and polyimide resins. These resins may be in the form of homopolymers, copolymers or a blend of two or more of these. These materials may be shaped in various forms such as a plate, sheet, film, or bloc, and are not limited to a planar plate-like articles. Depending upon the purpose of use, these materials may be colored, noncolored, transparent, or non-transparent.

A flexible transparent film or sheet is preferred as the shaped solid substrate (A). Transparent plastic films, especially polyester films (e.g., polyethylene terephthalate films), having a visible light transmittance of at least about 80% are especially preferred. These films have a thickness of about 3 to about 500 microns, preferably 10–250 microns.

The layer (B) of the laminated structure of thin invention is a transparent thin layer having a high refractive index in contact with one or both surfaces of the layer (C). When the layer (B) is provided on both surfaces of the layer (C), it may be a transparent thin layer (B') whose refractive index is not high. The layer (C) is a transparent heat wave-reflective thin layer of an electrically conductive metal in contact with the substrate (A) or with the transparent thin layer (B). The laminated structure of this invention may optionally contain a transparent top layer (D). The layer (B') may be similar to the layer (D).

Accordingly, the laminated structure of this invention can be obtained in the following embodiments.

(1) Substrate (A)/layer (B)/layer (C)/layer (B)/optionally layer (D)
(2) substrate (A)/layer (B')/layer (C)/layer (B)/optionally layer (D)
(3) substrate (A)/layer (B)/layer (C)/layer (B')/optionally layer (D)
(4) Substrate (A)/layer (C)/layer (B)/optionally layer (D)
(5) Substrate (A)/layer (B)/layer (C)/optionally layer (D)

The embodiments (1), (2) and (3) are preferred, and the embodiment (1) is especially preferred.

In the present invention, a transparent thin layer having a high refractive index is used as the layer (B). Preferably, the transparent thin layer has a refractive index of at least about 1.6, preferably at least about 1.7, with respect to the visible light. Preferably, the layer (B) has a visible light transmittance of at least 80%, especially at least 90%. Preferably, the layer (B) has a thickness of about 50 to about 1000 Å, especially 100 to 500 Å.

To be advantageous in regard to these preferred conditions, the layer (B) may be a thin layer of titanium dioxide, zirconium oxide, bismuth oxide, zinc sulfide, tin oxide, indium oxide, etc. The thin layer may be provided by known means such as sputtering, ion plating, vacuum deposition, wet coating, etc. More preferably, the layer (B) is composed of a metal oxide or sulfide selected from the group consisting of an oxide of titanium, an oxide of bismuth and a sulfide of zinc. A thin layer of the oxide of titanium is especially preferred because of its excellent optical properties such as transparency and refractive index with respect to the visible light.

Such a thin layer of the oxide of titanium may be a thin layer of an oxide of titanium derived from a layer of an organic titanium compound, or may be a thin layer of an oxide of titanium formed by known means such as vacuum deposition and sputtering. Sputtering may be performed, for example, by a low humidity magnetron sputtering method, a method of argon gas sputtering of titanium oxide, or a method of reactive sputtering by introducing oxygen into metallic titanium. According to the vacuum depositing method, a thin layer of titanium oxide may be formed by utilizing electron beams, etc. The thin layer of titanium oxide so formed may contain titanium nitride in an amount which does not affect its properties.

Usually, the thin layer of an oxide of titanium derived from a layer of an organic titanium compound contains an organic residual moiety of the organic titanium compound. In this embodiment, the layer (B) can be formed, for example, by using an organic solvent solution of a solute containing an alkyl titanate as a main ingredient. The alkyl titanate can be represented by the general formula $Ti_lO_mR_n$ in which R is an alkyl group, and l, m and n are positive integers.

Those of the above general formula in which $m=4+(l-1)\times 3$, $n=4+(l-1)\times 2$, and $l=1$ to 30 are preferred because of the ease of film formation (for example, coating) or the characteristics of the resulting dielectric layer. The value l needs not to be a single value, and may be distributed. Especially, alkyl titanates of the above general formula in which l has such a distribution that its maximum value exists at 15 or below are preferred in regard to the viscosity of the resulting coating solution and the hydrolyzability of the alkyl titanate. In the above general formula, the alkyl substituent R preferably contains 1 to 20 carbon atoms. Alkyl titanates of the above formula in which R is an alkyl group containing 2 to 11 carbon atoms are preferred in regard to the ease of coating, the rate of hydrolysis, and the mechanical properties and transparency of the resulting layer. The alkyl titanates may be used singly or as a mixture.

When the alkyl titanate is dissolved in an organic solvent and the solution is coated on the surface of a shaped article, it is hydrolyzed by moisture in the atomosphere. Condensation reaction which occurs subsequently results in the elimination of alkyl hydroxide to form a network structure. By selecting the conditions for coating, the amount of the organic residual moiety of the organic titanium compound contained in the layer (B) and the amount of the titanium compound converted can be controlled. The amount of titanium oxide is preferably 70 to 99.9% by weight, more preferably 90 to 99.5% by weight, based on the weight of the layer (B) in the dry state. The content of the organic residual moiety is preferably 0.1 to 30% by weight, more preferably 0.5 to 10% by weight, based on the organic groups contained in the layer (B) in the dry state. When the amount of the organic residual moiety is too small, the adhesion of the layer (B) to the substrate (A) is reduced. If it is too large, the transparency of the resulting layer is reduced. Thus, it is preferably limited to the above range. The amount of the organic residual moiety is expressed by the amount of the alkyl groups contained in the layer (B).

Examples of the alkyl titanate are tetrabutyl titanate, tetraethyl titanate, tetrapropyl titanate, tetrastearyl titanate, tetra-2-ethylhexyl titanate, and diisopropoxytitanium bis-acetyl acetonate. Above all, tetrabutyl titanate and a tetrapropyl titanate are preferred. These alkyl titanates may be used directly, and their precondensation products in the form of, for example, a dimer, tetramer or decamer can also be used preferably.

Also, these alkyl titanates may be stabilized with acetylacetone prior to use.

Suitable organic solvents generally used for film formation from the alkyl titanates are those which fully dissolve the alkyl titanates, have affinity for the surface of the shaped solid substrate (A) and which are easy to coat and permit easy drying of the coated film. Examples of such organic solvents include hydrocarbons, alcohols, ethers, esters, carboxylic acids and halogenated hydrocarbons, such as hexane, cyclohexane, heptane, octane, methylcyclohexane, toluene, benzene, xylene, octene, nonene, solvent naphtha, methanol, ethanol, isopropanol, butanol, pentanol, cyclohexanol, methylcyclohexanol, phenol, cresol, ethyl ether, propyl ether, tetrahydrofuran, dioxane, acetone, cyclohexanone, methyl ethyl ketone, methyl isobutyl ketone, methyl acetate, ethyl acetate, propyl acetate, butyl acetate, ethyl propionate, methyl benzoate, glacial acetic acid, chloroform, carbon tetrachloride, trichloroethylene, trichloroethane, chlorobenzene, dibromoethane, methyl Cellosolve, and Cellosolve, Cellosolve acetate. Among these, isopropanol, butanol, n-hexane and toluene are preferred. These organic solvents can be used singly or as a mixture. If desired, water-containing solvents may be used.

If desired, heating to a temperature of about 5° to about 100° C. may be employed in forming the organic solvent solution of an organic titanium compound. To improve the adhesion, refractive index, color, hardness, etc. of the coated film, some amount of another ingredient soluble in organic solvents may be added. Examples of such an ingredient are solvent-soluble resins such as silicon-containing resins, acrylic resins, epoxy resins and polyurethane resins.

The concentration of the organic solvent solution of the alkyl titanate is optional, but to provide a thin layer of several hundred Angstroms, it is advisable to adjust the concentration of the alkyl titanate to 0.1 to 30% by weight, preferably 0.5 to 10% by weight, especially 1 to 7.5% by weight. The solution can be coated on the surface of the shaped substrate by various methods, for example, a dipping method, a spray method, a spinner method, and methods utilizing general coating machines such as a gravure coater, a Myer bar coater, or a reverse roll coater. When applying the coating solution to a substrate having a smooth surface such as a film or sheet, the use of a gravure coater or a Myer bar coater is preferred from the standpoint of the control and uniformity of the thickness of the coated film. The spraying method is preferred for coating on a non-smooth substrate. Simultaneously with, or after, the coating of the solution, the coating is dried at a temperature above room temperature, and if desired, heat-treated to complete the coating process. The drying or heat treating temperature is 50° to 200° C., and the treating time is about 10 seconds to about 10 hours.

As a result of the coating in this way, the alkyl titanate is hydrolyzed to form a thin layer of an oxide of titanium (B) containing a residual organic moiety derived from the alkyl titanate.

The amount of the residual organic moiety can be reduced to a desired low value by contacting the coated layer after the coating and drying of the alkyl titanate compound with an atmosphere having a suitable moisture content, preferably with an atmosphere having a high temperature and a high humidity, or with hot water (for example, an atmosphere at 80° C. and a RH of 80%, or water at 80° C.).

The formation of titanium oxide layer (B) from the organic titanate compound by such means has the advantage that the refractive index of the titanium oxide layer, the adhesion of the titanium oxide layer to the substrate, etc. can be freely controlled.

The refractive index of the thin layer (B) of the oxide of titanium containing an organic residual moiety in accordance with a preferred embodiment of this invention is lower than that of a conventional $TiO_2$ layer, and is about 1.6 to 2.4 in a visible light region. By the use of this thin layer (B), the light transmittance of the layer (B) is uniform over a large area. The layer (B) has superior adhesion to the substrate (A). The superior adhesion is especially advantageous when the substrate is made of such a material as a polyester. Another advantage is that the layer (B) has a high light transmittance over a wide range of wave-lengths in the visible region.

The layer (C) in the laminated structure of this invention is composed of at least about 50% by weight of Ag, 3 to about 30% by weight, preferably about 5 to about 30% by weight, of Au, and about 0.5 to about 30% by weight, preferably about 1 to about 25% by weight, more preferably about 1 to about 15% by weight, especially preferably about 1 to about 8% by weight, of Cu, based on the total weight of Ag, Au and Cu. The more preferred lower limit of the amount of Cu is about 3% by weight.

The layer (C) may be a single layer composed of Ag, Au and Cu, or may be a laminated layer or the like composed of Ag, Au and Cu.

The single layer means a thin metallic layer in which silver, gold and copper atoms are present together, whether completely uniformly or somewhat nonuniformly.

In the laminate of the thin metal layer, there are six combinations of laminating the three metals (silver, gold and copper), and any of these combination can exhibit the effects intended by the present invention. A somewhat nonuniform mixed layer may permissibly exist on the metal layer boundaries. In this layer, the three dissimilar metals contact with one another to form a layer.

When laminating thin layers of these metals, the effects of this invention are not impaired even by first forming a single thin metal layer containing any two metals selected from silver, gold and copper, and laminating a layer of the remaining one metal. The following combinations (a) to (l) can, for example, be cited as the type of lamination. Of these, the combinations (a), (b), (d), (f), (g), (h), (k), and (l) are preferred, and the combinations (a), (b), (d), (f), (g) and (h) are especially preferred.

(a) gold layer/silver layer/copper layer
(b) gold layer/copper layer/silver layer
(c) silver layer/gold layer/copper layer
(d) silver layer/copper layer/gold layer
(e) copper layer/gold layer/silver layer
(f) copper layer/silver layer/gold layer
(f) silver-copper layer/gold layer
(h) gold layer/silver-copper layer
(i) silver layer/gold-copper layer
(j) gold-copper layer/silver layer
(k) copper layer/gold-silver layer
(l) gold-silver layer/copper layer The layer (C) may contain other components such as aluminum, nickel, palladium, platinum, indium, tin, cadmium, germanium, and zinc in amounts which do not impair the effects of this invention (e.g., in amounts of up to about 0.4% by weight based on the total weight of Ag, Au and Cu).

The layer (C), either single or laminated, composed of silver, gold and copper in the laminated structure of this invention may be formed by various methods.

For example, by vacuum-deposition or sputtering an alloy of silver, gold and copper, a single thin metallic layer (C) containing silver, gold and copper together can be obtained. Or by a multi-component vacuum depositing method or a multi-component sputtering method in which silver, gold and copper are separately vacuum-deposited or sputtered, it is possible to obtain a single thin metallic layer (C) containing silver, gold and copper together, or a thin metallic layer (C) in which silver, gold and copper are laminated in the desired sequence.

In the present invention, an Ag-Au-Cu metallic layer may be provided by forming a single or laminated layer of Ag and/or Au, treating the layer with a copper chelate compound to include Cu therein and if desired, forming a layer of Ag or Au thereon. This treatment can be performed, for example, by applying a solution of the copper chelate compound to the metallic layer, or applying it to the layer (B) and providing a metallic layer thereon, or by dipping the single or laminated layer in the aforesaid solution. Such a copper compound may, for example, by an organic copper chelate compound such as cupric acetylacetonate, cupric trifluoroacetylacetonate, ethylenediaminetetraacetic acid copper salt, phthalocyanine blue, hemocyanin, dimethyldithiocarbamic acid copper salt, diethyldithiocarbamic acid copper salt, and copper hydroxyquinoline. Organic acid salts of copper such as cupric citrate, cupric tartrate, cupric lactate and cupric acetate may equally be used. When a great effect is to be expected, the aforesaid copper chelate compound is preferred. Curpic acetylacetonate and ethylenediaminetetraacetic acid copper salt are preferred.

By the method of including copper in the metallic layer by treatment with a copper chelate compound, a similar effect to the case of the vacuum depositing method can be produced.

Au and Cu to be copresent with Ag in the layer (C) are effective even when used in very small amounts. In order, however, that the resulting laminated structure has a heat degradation-resistant time (the time which elapses until the reflectance of infrared rays having a wavelength of 10 microns decreases to 80%) and a carbon arc light degradation-resistance time of more than 1500 hours, the preferred amount of gold is at least 3% by weight and the preferred amount of copper is at least 0.5% by weight. The durability of the layer (C) can be further improved by using at least 5% by weight of gold and at least 3% by weight of copper. The color of the laminated structure varies according to the amounts of gold and copper to be copresent with silver, and therefore, the amounts of gold and copper may be selected depending upon the color suitable for a particular application. In other words, as the content of gold increases, the color of the transparent body changes from a bluish shade to a golden shade. When the thickness of the layer is the same, the visible light transmittance decreases with increasing content of gold. Furthermore as the content of copper increases, the color of the transparent body changes from a bluish shade to a raddish shade, and when the thickness of the layer is the same, the visible light transmittance decreases with increasing content of copper.

Environmental stability tends to increase with increasing content of gold, and to decrease with increasing content of copper. Thus, when the content of gold exceeds 30% by weight, an adverse effect on optical properties outweights an effect exerted on the improvement of environmental stability. When the content of the copper exceeds 30% by weight, environmental stability decreases markedly, and the optical properties are also undesirable. In view of these, the amount of gold contained in the thin metallic film is at least about 3% by weight and up to about 30% by weight, and the amount of copper is at least about 0.5% by weight and up to about 30% by weight. Also, from the viewpoint of harmony between the optical properties and environmental stability desired in the resulting laminated structure, the amount of gold is preferably from about 5 to about 30% by weight, and the amount of copper is preferably about 1% by weight to about 25% by weight. When the chemical resistance and corrosion resistance of the resulting laminated structure are of importance, it is preferred to use copper in an amount of about 1 to about 15% by weight, especially preferably about 1 to about 8% by weight.

The thickness of the layer (C) is not particularly restricted if it has the properties required of a transparent electrically conductive film or a selectively light-transmitting film. To achieve heat wave-reflecting ability or electrical conductivity, the thin metal layer (C) should be continuous within a certain region. Preferably, the thickness of the layer (C) at a portion having a continuous structure contiguous to an island-like structure is at least about 50 Å, and from the standpoint of transparency to solar energy, it is preferably not more than about 500 Å. Since the light-pervious region is broadened with smaller thickness of the thin metal layer (C), the thickness of the layer (C) is preferably not more than 200 Å in order to increase transparency, and to impart sufficient electric conductivity or the ability to reflect heat wave, the thickness of the layer is preferably at least 70 Å.

When the metal layer (C) is a laminated metal layer, it is preferred that the total thickness of the individual layers should be within the above-specified range. By controlling the thicknesses of the individual layers, the content of each metal can be changed.

In the present invention, the aforesaid effects of the constituent metals can be exhibited even when these metals are not in the form of alloy. It is presumed that these metals exhibit an action which is difficult to predict from the effect of adding dissimilar metals usually taught by metallurgy.

The thin metallic layer (C) may be formed by any of a vacuum deposition method, a cathode sputtering method, an electroless plating method, an electroplating method and combinations thereof. When a shaped substrate, such as a sheet for film, used in producing the laminated structure has a smooth surface, the vacuum-depositing method is especially suitable for forming the layer (C) in view of the uniformity of the resulting film, the ease of production and the speed of film formation.

To maintain the proportions of silver, gold and copper in the layer as uniform as possible, sputtering of an alloy or a multiplicity of metals is suitable. In the vacuum deposition process, too, it is preferred to deposit a multiplicity of metals, or to deposite an alloy sample using electron beam heating, high frequency induction heating, resistance heating or flash evaporation.

Optionally, a transparent top layer (D) may be provided in the laminated structure of this invention. When the layer (B) is provided on both surfaces of the layer (C), a transparent thin layer (B') whose refractive index is not high may be provided on one of the two surfaces of the layer (C). The layer (B') may be of the same material as the layer (D).

Specifically, the layer (D) may be provided on the surface of the laminated structure in order to mainly improve such properties as surface hardness, weatherability, corrosion resistance and soiling resistance. Or it may be directly provided as layer (B') on the substrate (A) in order to improve adhesion.

Examples of the material of which the layer (D) is made include organic materials, for example acrylate resins such as poly(methyl methacrylate), acrylic resins such as polyacrylonitrile or polymethacrylonitrile, polyolefins such as polyethylene or polypropylene, silicon resins such as a polymer of ethyl silicate, polyesters, melamine resins and fluorocarbon resins; and inorganic materials such as silicon oxide, magnesium fluoride and alumina. Several resins or substances may be selected from the above compounds to use them as a laminate.

When low absorbability in the infrared region is important, the layer (D) or (B') is preferably made of an acrylic resin such as polymethacrylonitrile or polyacrylonitrile or a polyolefin such as polyethylene or polypropylene.

Preferably, the acrylic resin protective layer is coated to a thickness of not more than 0.05 micron or at least 1.6 microns in order to avoid adverse effects by the optical interference effect. A suitable polyolefin protective layer is, for example, a polypropylene film which is biaxially stretched and has a thickness of not more than 12 microns. In order to increase the surface hardness of the protective layer, trimethylolpropane triacrylate or tetramethylolpropane tetraacrylate (a product of Shin Nakamura Kagaku Kabushiki Kaisha), which is an ultraviolet-curable surface hardening resin, may be laminated on its surface and solidified. Silicon oxide and magnesium fluoride are preferably used as a material for the protective layer because the inorganic protective layer has reduced optical absorption and a high surface hardness.

When the layer (B') is to be directly provided on the substrate (A), it is preferably a layer of a silicate resin such as a condensate of trimethoxymono methylsilane or triethoxymonomethylsilane.

The surprising characteristic feature of the laminated structure of this invention is the improvement of its durability by the provision of the protective layer (D). Usually, one tends to think that the provision of a protective layer increases durability in any case. But this is not always so in a thin laminated structure having special functions as contemplated by the present invention.

For example, a laminated structure was prepared by covering both surfaces of a thin silver layer as layer (C) with a thin titanium oxide layer and superimposing the resulting structure on a polyester film. Additional three types of laminates were made by using an Ag-Cu layer, an Ag-Au layer and an Ag-Au-Cu layer respectively instead of the Ag layer. Durabilities of these laminated structures were examined in the presence or absence of a protective layer (D). The results are as shown in Table 8 in Examples 30 to 33.

It is noted that the laminated structure having silver alone as the metal layer (C) has both very low light resistance and corrosion resistance irrespective of the provision of the transparent protective layer. The laminated structure having the metal layer (C) composed of silver and copper tends to have increased light resistance and corrosion resistance by providing the transparent protective layer, but its corrosion resistance does not have sufficient durability. However, as a result of adding copper to silver, the light resistance of the laminated structure increases to more than 10 times. The laminated structure having the metallic layer (C) composed of silver and gold has stabilized corrosion resistance as a result of providing the transparent protective layer (D), but its light resistance decreases and the laminated structure partly turned violet. This discoloration frequently occurs irrespective of the type of the transparent protective layer (D). It occurs within a time period about 1/10 of the light resistance time of the laminated structure having no transparent protective layer (D). Surprisingly, it has been found that such a defect can be completely removed by using a thin metallic layer (C) composed of silver, gold and copper and both the light resistance and corrosion resistance of the laminated structure can be improved.

In short, when a transparent protective layer is used, the durability of the light resistance and corrosion resistance of a laminated structure containing a metal layer (C) composed of only silver increases to 70 times in a laminated structure having a thin metallic layer composed of silver and copper, to 13 times in a laminated structure having a thin metallic layer composed of silver and gold, and to 400 times in a laminated structure having a thin metallic layer composed of silver, gold and copper.

The laminated structure of this invention is used as a transparent electrode or an antistatic layer. The laminated structure having the layers (C) and (B) having superior selectively light-transmitting property is used conveniently as a selectively transmitting material for effective utilization of sunlight, and/or as an energy saving material utilizing its heat insulating property. A laminated structure composed of a colored shaped substrate and the layers (C) and (B) formed on its surface has electric conductivity without impairing the color of the shaped substrate, and serves to prevent static buildup in the shape substrate. A laminated structure composed of a colored shaped substrate and the layers (C) and (B) having superior heat wave-reflecting ability has superior ability to reflect heat waves without impairing the color or design of the shaped substrate. A laminated structure composed of a shaped colored to a color which well absorbs sunlight, such as black, and the layers (C) and (B) having superior selectively light-transmitting property is used effectively as a selectively absorbing material which well absorbs sunlight and exhibits reduced heat radiation.

When such a selectively absorbing material is used as a heat absorbing medium of a solar energy water heater for obtaining warm water utilizing sunlight, the efficiency of utilizing the heat of the sun can be markedly increases.

For example, when the surface of a shaped article which permits passage of water, such as a pipe, is colored for good absorption of sunlight and the laminated structure of this invention having superior selective light transmission is formed on the colored surface of the shaped article, there can be obtained a solar energy collector having such an effect of selective absorption.

A polymeric sheet or film is preferably used as a substrate in the laminated structure of this invention because it can permit continuous formation of the laminated structure of this invention. Particularly, when the laminated structure of this invention is produced by using a transparent polymeric sheet or film, it has the advantage of light weight, high flexibility, good resistance to breakage and ease of processing. For example, such a structure is used favorably as a transparent electrode for electroluminiscence, a transparent electrode for a photoconductive photosensitive body, or as a thermal insulation film provided at or near the windowpanes of buildings to prevent heat loss. When the substrate is a sheet or film, the laminated structure can be produced continuously, and the speed of production can be greatly increased. Thus, the laminated structure can be supplied in great quantities at low cost.

By controlling the thickness of the thin metal layer (C) and the thickness of the thin layer (B) of the laminated structure of this invention and the method of laminating them, the visible light transmittance, surface resistance and infrared reflectance of the laminated structure can be freely changed as required. The laminated structure so obtained has the following typical applications.

(a) A transparent electrically conductive laminate used in an antistatic or photoconductive photosensitive layer;

(b) a transparent electrode for a solid display or panel illuminator such as a liquid crystal electroilluminator;

(c) a transparent panel heater used as a heater such as a defrost heater for the windows of motor vehicles; and (d) a transparent thermal insulating laminate to be applied to the glass portions of windowpanes of buildings, greenhouses, and refrigerating and cooling showcases.

The following examples illustrate the present invention more specifically.

The light transmittance values are those at a wavelength of 500 nm unless otherwise indicated.

The infrared reflectance was measured by an infrared spectrophotometer (Model EPI-II, a product of Hitachi Limited) provided with a reflectance measuring device. The reflectance of a structure obtained by vacuum deposition of silver to a sufficient thickness (about 3000 Å) on a slide glass was taken as 100%.

The amount of the organic residual moiety contained in the thin layer of titanium oxide derived from an organic titanium compound was measured as follows:

A sample laminate was cut into square-shaped small pieces each side measuring about 2 mm. These pieces were dipped at room temperature for 24 hours in a solution consisting of 1,000 parts by weight of water, 20 parts by weight of ethanol and 1 part by weight of hydrochloric acid to extract the organic components. The amount of the organic components was obtained from these quantitative determination of the ions by mass fragmentgraphy on a gas chromatographic mass analyzer (Model LKB-900 made by Shimadzu Seisakusho Co., Ltd.) using a glass column, b 3 mm in diameter and 3 m in length, packed with Chromosorb W (60–80 mesh) having 30 parts by weight of PEG-20 attached to it.

The proportions of elements in the thin metallic layer were determined by a fluorescent X-ray analyzing method using a fluorescent X-ray analyzer (made by Rigaku Denki Co., Ltd.).

EXAMPLE 1

To a biaxially stretched polyethylene terephthalate film having a light transmittance of 86% and a thickness of 75 microns were successively laminated a thin titanium oxide layer having a thickness of 300 Å as a first layer, a thin layer composed of 20% by weight of gold, 5% by weight of copper and 75% by weight of silver and having a thickness of 160 Å as a second layer and a thin titanium oxide layer having a thickness of 300 Å as a third layer to form a laminated structure having transparency, electric conductivity and selectively light-transmitting property.

Both of the titanium oxide layers were provided by coating a solution composed of 3 parts by weight of a tetramer of tetrabutyl titanate, 65 parts of isopropyl alcohol and 32 parts of n-hexane by a bar coater, and heating the coating at 100° C. for 5 minutes.

The single thin layer having silver, gold and copper was formed by a low-temperature magnetron sputtering method using a silver-gold-copper alloy (gold 20%, copper 5%, silver 75%).

The butyl group content of the thin titanium oxide layer in the first and third layers was 5.5% (determined by mass fragmentography for mass No. 56).

The resulting film structure had a light transmittance of 78%, a surface resistance of 13 ohms/m$^2$ and an infrared reflectance of 97%.

The film was exposed for 2000 hours to a carbon arc light fastness tester (Model CW-DV3 made by Shimadzu Seisakusho Co., Ltd.), and then its infrared reflectance was measured. The infrared reflectance was maintained at more than 80% both when the carbon arc light was irradiated from the side of the coating, and when it was irradiated from the side of the polyethylene terephthalate film.

The resulting film was put in a Geer's oven tester kept at 90° C. for 1000 hours, and the infrared reflectance of the film was measured. The infrared reflectance remained at more than 85%.

COMPARATIVE EXAMPLE 1

A laminated film structure was produced in the same way as in Example 1 except that the second thin metallic layer was made only of silver (film thickness 180 A.)

The resulting film was subjected to the carbon arc light fastness tester and the accelerated heat degradation test in the same way as in Example 1. The results are shown in Table 1. In all cases, the average time which elapsed until the infrared reflectance of the film decreased beyond 80% was measured, and shown in Table 1.

TABLE 1

| | |
|---|---|
| Carbon arc | 50 hours |
| Heat degradation test at 90° C. | 100 hours |
| Heat degradation test at 120° C. | 50 hours |

The degree of degradation was high, and the environmental stability of the film structure was poor.

EXAMPLES 2 TO 6

In each run, a laminated film structure having transparency, electric conductivity and selectively light transmitting property was produced in the same way as in Example 1 except that the composition and film thickness of the thin metal layer were changed as shown in Table 2.

The resulting film structure had a visible light transmittance of more than 75% and an infrared reflectance of more than 95%.

TABLE 2

| Example | Composition (*) of the thin metal layer (% by weight) Au | Cu | Thickness of the thin metal layer (Å) | Corrosion resistance test |
|---|---|---|---|---|
| 2 | 20 | 3 | 180 ± 10 | No change |
| 3 | 20 | 5 | " | No change |
| 4 | 20 | 10 | " | No change |
| 5 | 20 | 20 | " | A few small light brown spots formed |
| 6 | 20 | 28 | " | A few small light brown spots formed |
| Comparison | 20 | 35 | " | Many light brown spots formed, and considerable dissolution occurred locally |

(*) The remainder was composed of silver.

An acrylate resin (Dianal LR574, a product of Mitsubishi Rayon Co., Ltd.) was coated on the resulting film by a bar coater, and dried for 3 minutes in a hot air dryer set at 120° C. to form an acrylic protective layer having a thickness of 2 microns. The resulting film structure had a visible light transmittance of more than 67% and an infrared reflectance of more than 88%.

The film structure was subjected to the carbon arc light fastness test and accelerated heat degradation test in the same way as in Example 1. In each test, the film structure had an infrared reflectance of more than 80% and showed no appreciable change in appearance, etc. after a lapse of 2000 hours.

An aqueous solution of sodium hydrochlorite was sprayed onto the film structure in an amount of 100 ppm three times a day to test the corrosion resistance of the thin metallic layer and the condition of corrosion after a lapse of 30 days was examined. The results are also shown in Table 2.

EXAMPLES 7 TO 9

In each run, a transparent, electrically conductive and selectively light-transmitting film was produced in the same way as in Example 1. An acrylate resin or acrylic resin was coated on the film structure or a polypropylene film was laminated to the film structure to obtain a laminated structure having a protective layer. The resulting laminated structure had an infrared reflectance of more than 85%, and a visible light transmittance of more than 60%.

The acrylate resin layer was formed in the same way as in Example 2. Specifically, a solution of polymethacrylononitrile in a mixture of methyl ethyl ketone and cyclohexanol was coated by a bar coater and dried for 2 minutes in a hot air desiccator kept at 130° C. to form a 2 micron-thick layer.

The polypropylene film (thickness 12 microns) was coated with a tackifier (S-1601, a product of Toa Gosei Kabushiki Kaisha) by a bar coater, and then bonded to the surface of the laminated film structure.

The resulting film structure was dipped for 3 hours in 1 N hydrochloric acid, but no change occurred.

COMPARATIVE EXAMPLES 2 TO 6

In each run, a transparent, electrically conductive and selectively light-transmitting laminated film structure was produced in the same way as in Example 1 except that the composition and thickness of the thin metal layer were changed as shown in Table 3.

A protective layer of acrylic resin was laminated on the resulting film structure in the same way as in Example 2. The corrosion resistance of the resulting film structure was tested by dipping it for 3 hours in 1 N hydrochloric acid and also by spraying an aqueous solution of sodium hypochlorite and observing the condition of the sample 30 days after as in Example 2.

The results are shown in Table 3.

TABLE 3

| Comparative Example | Composition of the thin metal layer (% by weight) (*) Au | Cu | Thickness of the thin metal layer (Å) | Corrosion resistance Dipping in HCl | Spraying of sodium hypochlorite |
|---|---|---|---|---|---|
| 2 | 0 | 0 | 180 ± 10 | Light brown spots formed | Mostly discolored and a great portion dissolved |
| 3 | 0 | 5 | " | Large spots formed; partial dissolution | Mostly discolored and a great portion dissolved |
| 4 | 0 | 15 | " | Large portion dissolved | Large portion dissolved |
| 5 | 5 | 0 | " | Small spots formed; scarcely any change | Many spots formed |
| 6 | 10 | 0 | " | Scarcely any change | Many spots formed |

(*) The remainder was composed of silver.

Transparent, electrically conductive, selectively light-transmitting laminated structures having the same constructions as in Comparative Examples 5 and 6 were subjected to the same carbon arc light irradiation test as in Example 1. After a lapse of 2000 hours, these laminated structures had an infrared reflectance of more than 80%. But they locally turned violet. The discolored portion was measured by a ESCA (JESCA-4, Nippon Denshi) for the distribution of the constituents in the depth direction. It was ascertained that gold, silver and titanium oxide diffused to one another.

EXAMPLE 10

A laminated structure having transparency, electric conductivity and selectively light-transmitting property was formed in the same way as in Example 1 except that a titanium oxide layer was formed by sputtering on the same polyethylene terephthalate film as used in Example 1.

The titanium oxide layer was formed by a low-temperature magnetron sputtering device using a sintered body of titanium oxide powder as a target. The sputtering conditions were: argon gas pressure $5 \times 10^{-3}$ torr, high-frequency input power 2 W/cm². Thus, a titanium oxide layer having a thickness of 300 Å was obtained. The resulting laminated film structure had an infrared reflectance of 95%, and a visible light transmittance of 80%.

The resulting film structure was subjected to the same carbon arc light irradiating test and accelerated heat degradation test as in Example 1. After a lapse of 2000 hours, it retained an infrared reflectance of more than 80%, and showed no appreciable change in appearance, etc.

EXAMPLES 11 TO 13

In each run, a laminated film structure having transparency, electric conductivity and selectively light-transmitting property was formed in the same way as in Example 1 except that the thin metal layer was formed of gold, silver and copper layers shown in Table 4 which were laminated in this order.

The individual metals were vacuum-deposited in the aforesaid order by a multi-component vacuum depositing method. For example, a predetermined amount of gold was vacuum-deposited, and then silver was vacuum-deposited thereon, followed by further vacuum-depositing copper to form a thin metal layer composed of separate layers of these metals.

Immediately after production, the resulting laminated structure was examined by ESCA (JESCA-4, a product of Nippon Densi Kabushiki Kaisha). The individual metal layers separated from each other, and the mutual diffusion occurred to a lesser extent than was expected.

A protective layer, 2 microns thick, of an acrylate resin was laminated onto the resulting laminated structure by the same method as in Example 2. The resulting structure was then subjected to the same carbon arc light irradiating test and accelerated heat degradation test as in Example 1. The laminated structure retained an infrared reflectance of more than 80% even after a lapse of 2000 hours.

TABLE 4

| Example | Metal layer construction (the left side is a film side) | Composition of the metal layer (% by weight)(*) Au | Cu | Thickness (Å) |
|---|---|---|---|---|
| 11 | Au . Ag . Cu | 25 | 8 | 175 |
| 12 | Ag . Cu . Au | 18 | 5 | 210 |
| 13 | Au . Cu . Ag | 21 | 12 | 190 |

(*) The remainder was composed of Ag.

EXAMPLES 14 TO 16

A laminated film structure having transparency, electric conductivity and selectively light-transmitting property was produced in the same way as in Example 1 except that the thin metal layer was formed by laminating a thin metal film on a thin metal layer composed of silver and copper.

The thin metal layer composed of silver and copper was formed by a magnetron sputtering method using a target composed of 92% by weight of silver and 8% by weight of copper, and then vacuum-depositing gold on the resulting layer.

The resulting laminated structure had an infrared reflectance of more than 93% and a visible light transmittance of 75%.

A 2 micron-thick protective layer of polymethacrylonitrile was laminated onto the resulting laminated structure, and the resulting structure was dipper for 1 hour in 1 N hydrochloric acid. The results are shown in Table 5.

TABLE 5

| Example | Composition of the thin metal layer (% by weight)(*) Gold | Copper | Thickness of the metal layer (Å) | IN HCl test |
|---|---|---|---|---|
| 14 | 4 | 8 | 160 | No change |
| 15 | 10 | 8 | 185 | No change |
| 16 | 23 | 8 | 210 | No change |

(*) The remainder was composed of silver.

EXAMPLES 17 TO 22

In each run, a laminated structure having transparency, electric conductivity and selectively light-transmitting property was produced in the same way as in Example 1 except that the thickness of the metal layer was changed as shown in Table 6. The optical properties of the resulting laminated structure are shown in Table 6.

TABLE 6

| Example | Composition of the metal layer | Thickness of the metal layer (Å) | Infrared reflectance (%) | Integral visible light transmittance(%) (*) |
|---|---|---|---|---|
| 17 | Gold (20% | 350 | 97 | 32 |
| 18 | by weight) | 230 | 94 | 58 |
| 19 | Silver (75% | 190 | 92 | 63 |
| 20 | by weight) | 120 | 87 | 72 |
| 21 | Copper (5% | 90 | 80 | 77 |
| 22 | by weight) | 75 | 65 | 80 |

(*) Integral visible light transmittances at 450–700 nm.

EXAMPLE 23

To a glass sheet having a thickness of 2 mm were successively laminated a thin titanium oxide layer having a thickness of 250 Å as a first layer, a thin layer composed of 20% by weight of gold, 5% by weight of copper and 75% by weight of silver and having a thickness of 150 Å as a second layer, and a thin titanium oxide layer having a thickness of 300 Å as a third layer to form a laminated structure having transparency, electric conductivity and selectively light-transmitting property.

The two titanium oxide layers were each formed by coating a solution consisting of 5 parts of a tetramer of tetra-2-ethylhexyl titanate, 40 parts of n-hexane, 25 parts of toluene and 30 parts of butanol by a spayer using compressed nitrogen, and heating the coating at 110° C. for 3 minutes.

The single thin layer of silver, gold and copper was formed in the same way as in Example 1.

The resulting laminated structure had a light transmittance of 75%, a surface resistance of 15 ohms/m$^2$ and an infrared reflectance of 89%.

EXAMPLES 24 TO 29

In each run, a transparent, electrically conductive, selectively light-transmitting laminated film structure was produced in the same way as in Example 1 except that the composition of the thin metal layer was changed as shown in Table 7. The resulting laminated structure had an infrared reflectance of more than 90% and a visible light transmittance of more than 73%.

A 2 micron-thick transparent protective layer composed of polymethacrylonitrile was formed on the resulting laminated structure in the same way as in Examples 7 to 9.

The resulting laminated structure was subjected to the same carbon arc light irradiating test and accelerated heat degradation test as in Example 1. After a lapse of more than 2000 hours, the laminated structure had an infrared reflectance of more than 80%, and showed no appreciable change in appearance, etc.

The laminated structure was also dipped for 3 hours in 1 N hydrochloric acid. The results are shown in Table 7.

TABLE 7

| Example | Composition of the thin metal layer (% by weight)(*) Gold | Composition of the thin metal layer (% by weight)(*) Copper | Thickness of the metal layer (Å) | Test in 1N HCl |
|---|---|---|---|---|
| 24 | 3 | 5 | 170 ± 10 | No change |
| 25 | 7 | 5 | " | No change |
| 26 | 10 | 5 | " | No change |
| 27 | 16 | 5 | " | No change |
| 28 | 20 | 8 | " | No change |
| 29 | 25 | 8 | " | No change |

(*) The remainder was composed of silver.

EXAMPLES 30 TO 33

In each run, a transparent, electrically conductive and/or selectively light-transmitting laminated structure was formed in the same way as in Example 1 except that the composition and thickness of the thin metal layer were changed as shown in Table 8.

A transparent protective film, 2 microns thick, of polymethacrylonitrile was formed on the laminated structure in the same way as in Examples 7 to 9.

Thus, laminated structures having the same high refractive thin layer and thin metal layer compositions with the transparent protective layer were produced. These laminated structures were subjected to the same carbon arc light irradiating test for 1000 hours. The structure was also dipped for 1 hour in 1 N hydrochloric acid. The results are shown in Table 8.

TABLE 8

| Example | Thickness and composition of the thin metal layer Composition (% by weight) | Thickness and composition of the thin metal layer Thickness (Å) | Carbon arc irradiation for 2000 hours (reflectance at 10 μm) | Dipped in 1N HCl for 1 hour |
|---|---|---|---|---|
| 30 | Silver 100 | 175 | 10% (discolored) | Discolored in the form of spots |
| 31 | Silver 89 Copper 11 | 190 | 83% | Greatly discolored in the form of spots |
| 31 | Copper 11 | | | |
| 32 | Silver 80 Gold 20 | 210 | (75%) | No change |
| 33 | Silver 75 Gold 50 Copper 5 | 200 | 86% | No change |

EXAMPLE 34

A thin metal layer composed of 75% by weight of silver, 20% by weight of gold and 5% by weight of copper and having a thickness of 180 Å was formed directly on the same polyethylene terephthalate film as used in Example 1 by magnetron sputtering. A titanium oxide layer having a thickness of 350 Å was formed on the resulting thin metal layer in the same way as in Example 1. The resulting laminated structure had a visible light transmittance of 75% and an infrared reflectance of 95%.

EXAMPLE 35

The same thin metal layer and titanium oxide layer as formed in Example 34 were provided on the same sheet glass as used in Example 23. The resulting laminated structure had a visible light transmittance of 73%, a surface resistance of 15 ohms/m², and an infrared reflectance of 93%.

EXAMPLE 36

A thin metal layer composed of 75% by weight of silver, 20% by weight of gold and 5% by weight of copper and having a thickness of 180 Å was formed directly on the same polyethylene terephthalate film as used in Example 1, and then the resulting thin metal layer was formed an acrylic protective layer having a thickness of 2 microns in the same way as in Example 2. The resulting laminated structure had a visible light transmittance of 45% and an infrared reflectance of 85%.

EXAMPLE 37

A titanium oxide layer having a thickness of 300 Å was formed in the same way as in Example 10 on the same polyethylene terephthalate film as used in Example 1. A thin metal layer composed of 75% by weight of silver, 20% by weight of gold and 5% by weight of copper and having a thickness of 150 Å was formed on the resulting titanium oxide layer in the same way as in Example 34. Furthermore, in the same way as in Example 1, a titanium oxide layer having a thickness of 270 Å and derived from an alkyl titanate compound was formed on the thin metal layer. Thus, a transparent, electrically conductive and/or selectively light-transmitting laminated structure was obtained.

The resulting laminated structure had a visible light transmittance of 81% and an infrared reflectance of 97%.

EXAMPLE 38

A thin layer of titanium oxide having a thickness of 300 Å as a first layer and a thin metallic layer composed of 85% by weight of silver and 15% by weight of gold and having a thickness of 180 Å as a second layer were formed on a biaxially stretched polyethylene terephthalate film having a light transmittance of 86% and a thickness of 75 microns. The thin titanium oxide layer was formed by coating a solution composed of 5 parts of a monomer of tetrapropyl titanate, 30 parts of isopropanol, 40 parts of ethyl acetate and 25 parts of n-butanol by a bar coater and heating the coating at 120° C. for 3 minutes. The thin metallic layer was provided by a magnetron sputtering method using a two-component target consisting of 85% by weight of silver and 15% by weight of gold.

Methanol saturated with cupric acetylacetonate was sprinkled on the thin metallic layer of the laminated structure by a sprayer and dried at 100° C. for 1 minute. A thin titanium oxide layer having a thickness of 300 Å was formed as a third layer in the same way as above on the metallic layer treated with cupric acetylacetonate to afford a laminated structure which was transparent and had a high ability to reflect infrared rays.

The laminated structure had an infrared reflectance of 95% and a visible light transmittance of 72%. Fluorescent X-ray analysis showed that the amount of Cu contained in the resulting laminated structure was 6% by weight based on the weight of silver.

The laminated structure was subjected to a carbon arc irradiation test for 1500 hours and an accelerated durability test for 1000 hours at 90° C., respectively. In either test, the laminated structure retained an infrared reflectance of more than 85%, and showed scarcely any change in appearance.

EXAMPLE 39

A protective layer composed of polymethacrylonitrile and having a thickness of 2 microns was formed on the laminated structure obtained in Example 38. The protective layer of polymethacrylonitrile was formed by coating a coating solution consisting of 10 parts of polymethacrylonitrile, 30 parts of methyl ethyl ketone, 25 parts of dimethyl formamide and 35 parts of cyclohexanone by a bar coater and drying the coating in a desiccator at 130° C. for 2 minutes.

The resulting laminated structure had a visible light transmittance of 67% and an infrared reflectance of 88%.

The laminated structure was dipped in 1 N HCl for 1 hour, but no change was noted.

When it was subjected to a heat degradation test at 90° C., and a carbon arc light resistance test, respectively, scarcely and change was noted after a lapse of 1500 hours, and the laminated structure retained an infrared reflectance of 83%.

What we claim is:

1. In a heat wave-reflective or electrically conductive laminated structure composed of
   (A) a shaped solid substrate,
   (B) a transparent thin layer having a high refractive index of at least 1.6 with respect to visible light in contact with one or both surfaces of a layer (C) below, wherein when the layer (B) is provided on both surfaces of the layer (C), it can, at one surface, be a transparent thin layer (B) whose refractive index is lower than that of 1.6 with respect to visible light,
   (C) a transparent heat wave-reflective thin layer of an electrically conductive metal in contact with the substrate (A) or with the transparent thin layer (B), and wherein the laminated structure can also contain the following layer:
   (D) a transparent top layer;
   the improvement wherein said layer (C) is a layer composed of at least about 50% by weight of Ag, about 3 to about 30% by weight of Au and about 0.5 to about 30% of Cu, the amounts being based on the total weight of Ag, Au and Cu.

2. The structure of claim 1 wherein the amount of Au is about 5 to about 30% by weight and the amount of Cu is about 1 to about 15% by weight, based on the total weight of Ag, Au and Cu.

3. The structure of claim 1 wherein the layer (B) is a transparent thin layer having a high refractive index composed of a metal oxide or sulfide selected from the group consisting of an oxide of titanium, and an oxide of bismuth and a sulfide of zinc.

4. The structure of claim 1 wherein the layer (B) is a transparent thin layer having a high refractive index composed of an oxide of titanium derived from a layer of an organic titanium compound and containing an organic residual moiety of the organic titanium compound.

5. The structure of claim 1 wherein the substrate (A) is a shaped article of an organic synthetic resin.

6. The structure of claim 1 wherein the layer (B) has a thickness of about 50 to about 1000 Å.

7. The structure of claim 1 wherein the layer (C) has a thickness of about 50 to about 500 Å.

* * * * *